May 4, 1943.  J. S. THOMPSON  2,318,030
AUTOMATIC RECLOSING CIRCUIT BREAKER
Filed Oct. 1, 1941  5 Sheets-Sheet 1
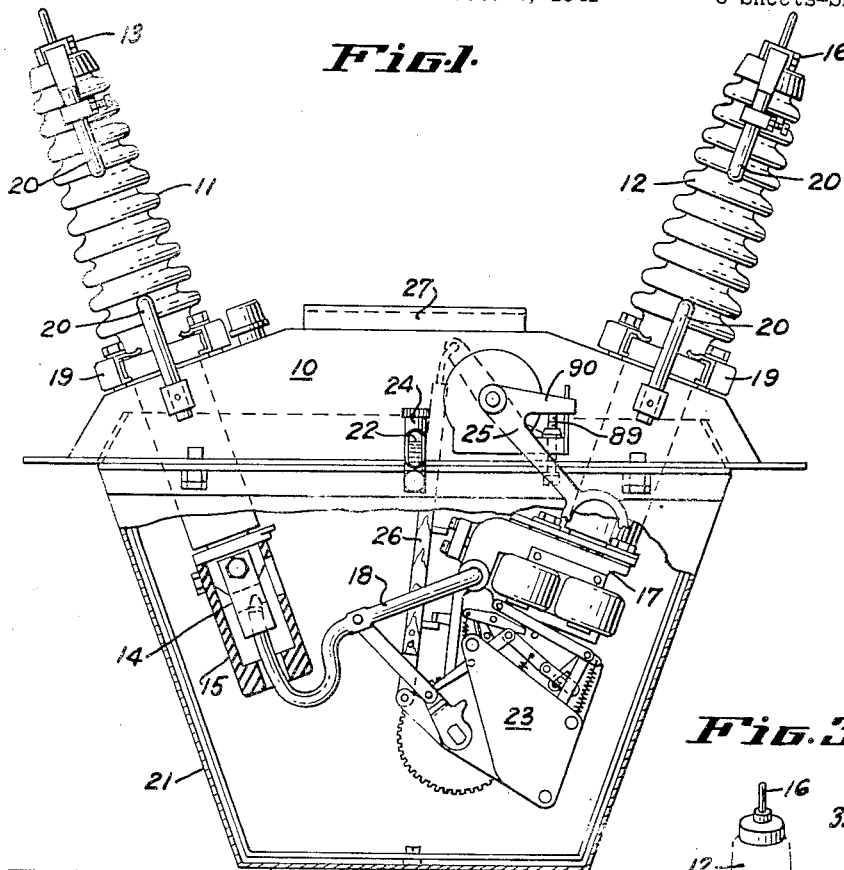
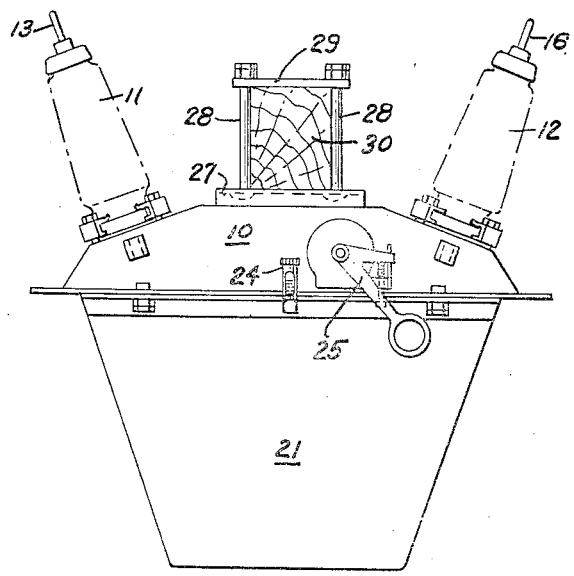
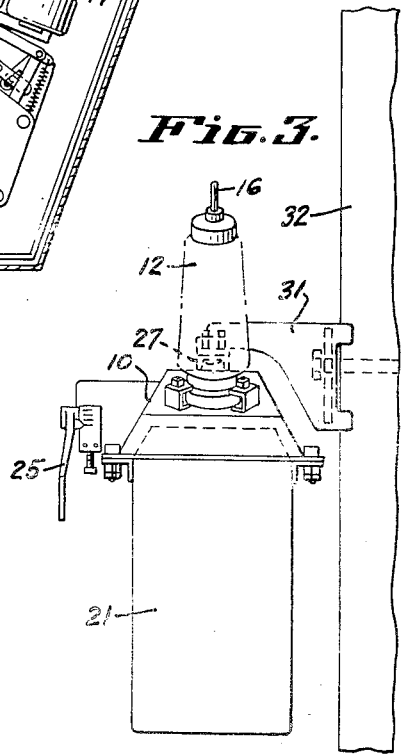
INVENTOR.
Joseph S. Thompson
BY
W. H. Atkinson
ATTORNEY.

May 4, 1943.    J. S. THOMPSON    2,318,030
AUTOMATIC RECLOSING CIRCUIT BREAKER
Filed Oct. 1, 1941    5 Sheets-Sheet 2
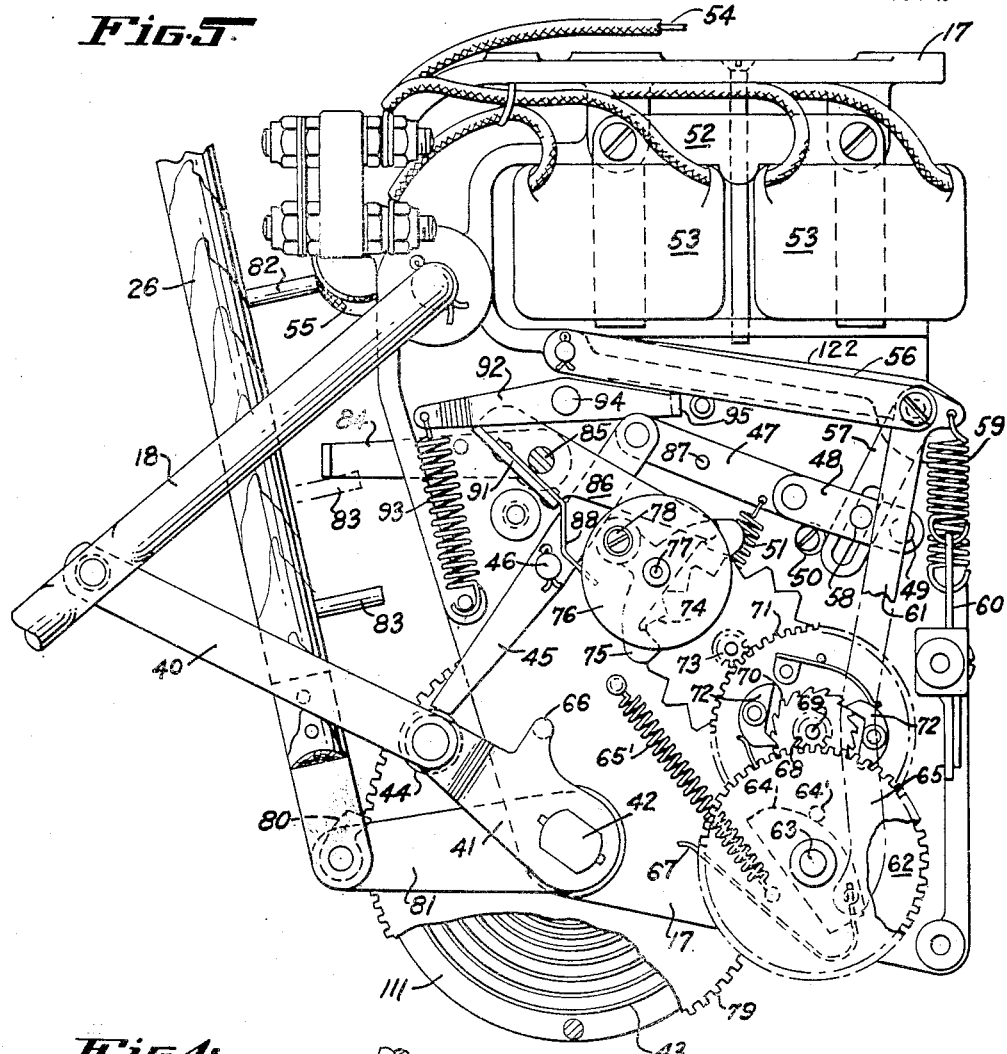
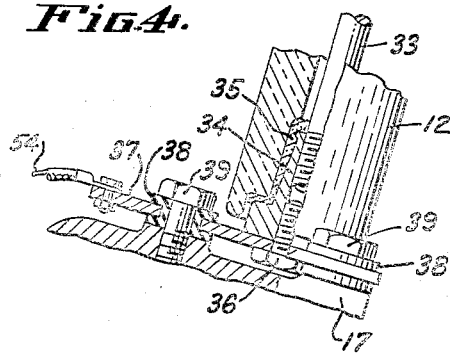
INVENTOR.
Joseph S. Thompson
BY
ATTORNEY.

May 4, 1943.  J. S. THOMPSON  2,318,030
AUTOMATIC RECLOSING CIRCUIT BREAKER
Filed Oct. 1, 1941  5 Sheets-Sheet 3
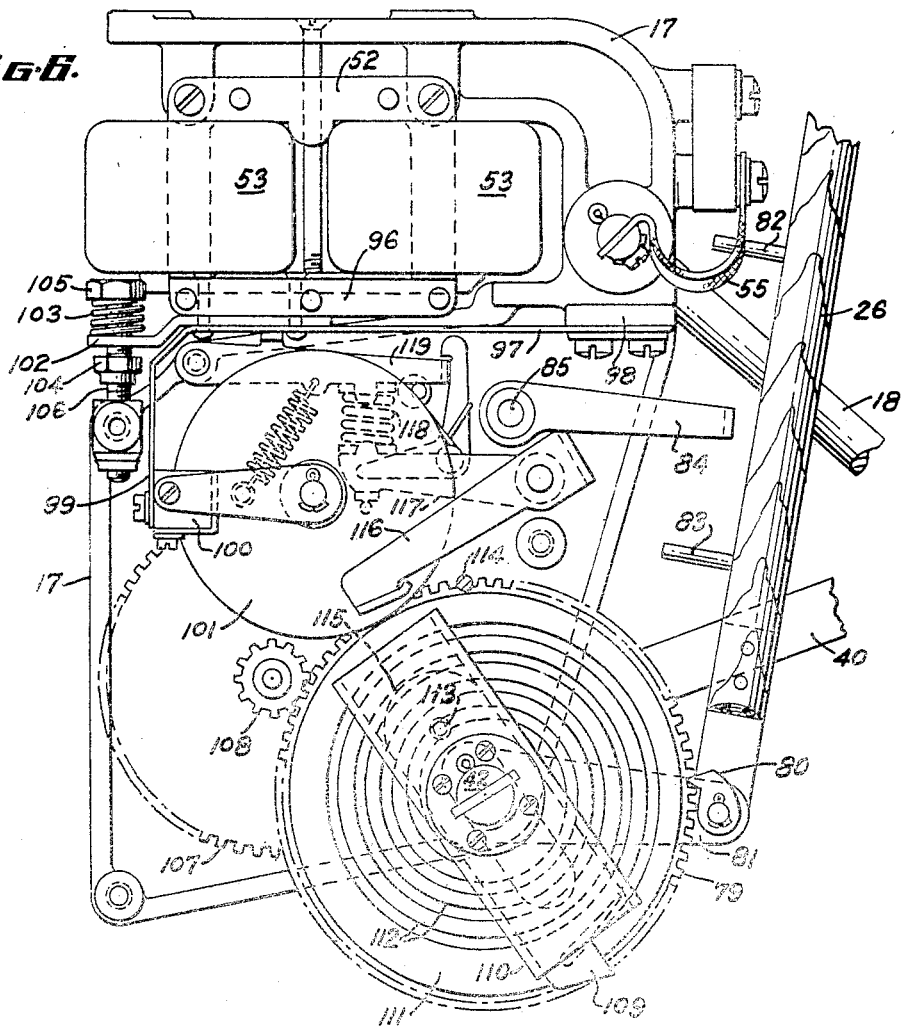
Fig. 6.
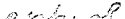

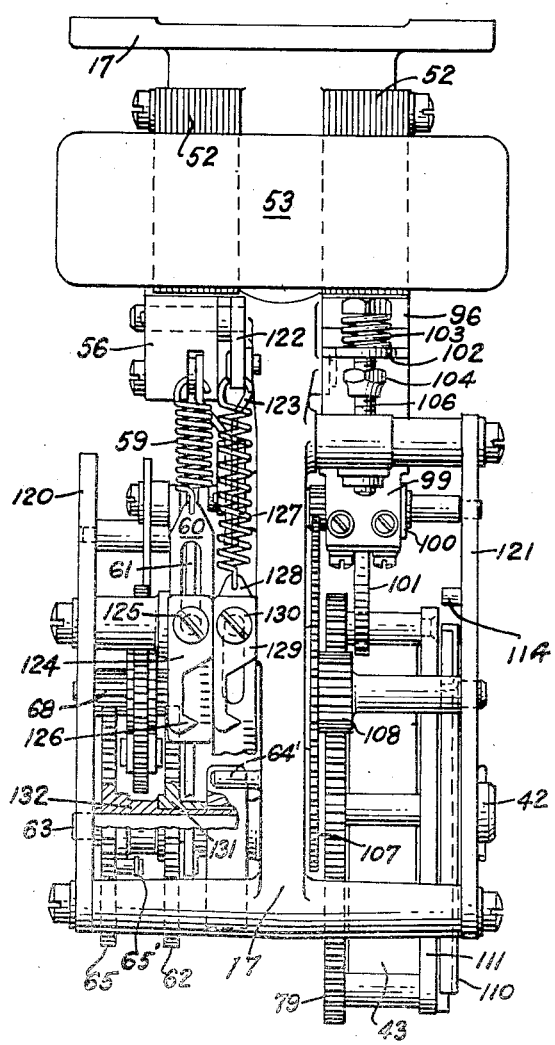

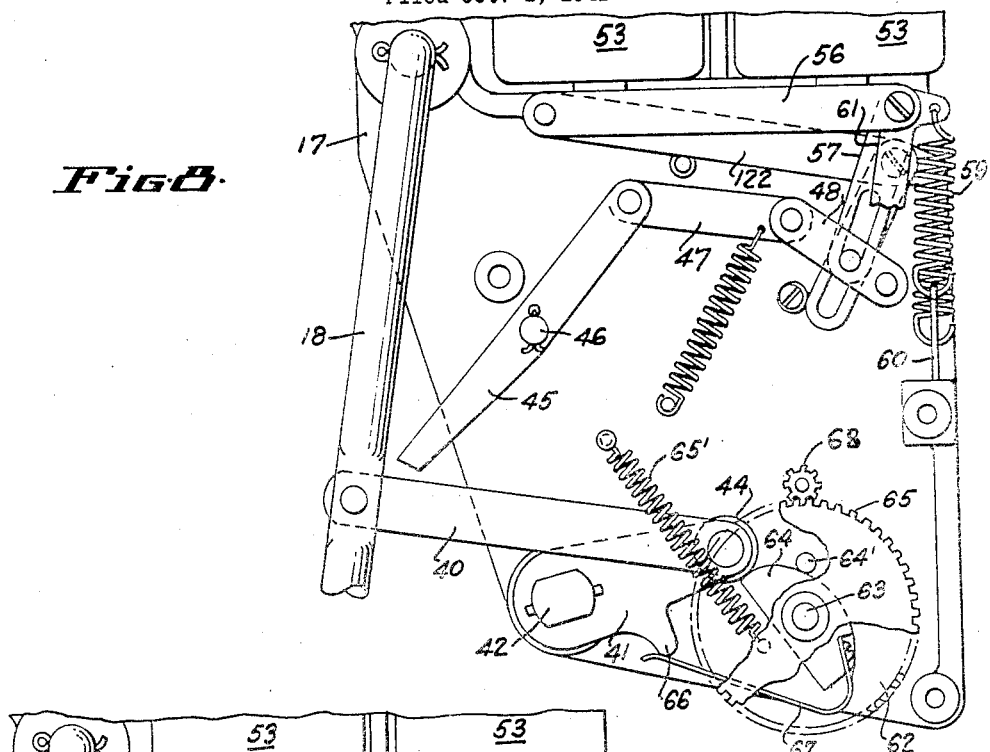

Patented May 4, 1943

2,318,030

UNITED STATES PATENT OFFICE 2,318,030

AUTOMATIC RECLOSING CIRCUIT BREAKER

Joseph S. Thompson, Los Altos, Calif., assignor to Pacific Electric Manufacturing Corporation, San Francisco, Calif., a corporation of California Application October 1, 1941, Serial No. 413,175

15 Claims. (Cl. 200—89)

The present invention relates to reclosing circuit breakers of the high potential type, such as are customarily used on rural power transmission lines, and more particuarly to a circuit breaker for this service which is operable to restore the circuit in an automatic manner in the event of a temporary fault upon the circuit.

An object of the invention is to provide a reclosing circuit breaker mechanism of the character designated that is simple in construction, reliable in its action and fully automatic in its operation.

Another object of the invention is to provide a new and novel operating and controlling mechanism for a reclosing circuit breaker of the type designated in which the operation of the circuit breaker is produced by an energy storing spring.

Another object of the invention is to provide a new and novel operating mechanism for a circuit breaker of the character described in which an electric motor for maintaining an energy storing spring in a wound condition is associated with the controlled circuit in a novel manner.

Another object of the invention is to provide a new and novel operating mechanism for a circuit breaker of the character described in which an electric motor for maintaining an energy storing spring in a wound condition is associated with electromagnetic controlling means in such a manner that a single energizing winding may be used for both purposes.

Another object of the invention is to provide an operating mechanism for an automatically reclosing circuit breaker having oil immersed contacts that is adapted to be mounted upon an insulating bushing and submerged in its entirety in the insulating oil with the circuit breaker contacts.

With the increasing use of electrical energy for domestic and industrial purposes in rural districts, it has become more and more important that protective means be provided for these transmission lines that will protect the power circuit against overloads and other abnormal conditions and at the same time provide, as nearly as possible, an uninterrupted service for these customers. Line troubles in the circuits supplying such users, due to transmission difficulties, are generally more frequent than on the main transmission lines, but in the majority of cases the fault is of short duration. It is, therefore, a further object of the invention to provide a circuit breaker which will open when a fault occurs and automatically reclose a short time later on the assumption that the trouble has disappeared and which, in the event of a sustained fault or overload, will provide a series of delayed reclosing operations and finally lock out in the event that the fault or overload has not been cleared from the line during any of these successive reclosing operations.

Other objects and advantages of the invention will be in part evident to those skilled in the art to which this invention appertains as the description thereof proceeds, and in part pointed out hereinafter in connection with the description of the accompanying drawings, wherein there is shown by way of illustration and not of limitation, a preferred embodiment of the invention.

In the drawings, wherein like numerals refer to like parts throughout the several views:

Figure 1 is a front elevation of a single pole circuit breaker constructed and arranged to operate in accordance with the present invention and with a portion broken away to disclose the operating mechanism, Figure 2 is an external view showing the circuit breaker of Figure 1 as mounted upon the crossarm of a transmission line pole or other structure, Figure 3 is a side elevation showing the circuit breaker of Figure 1 as mounted upon a bracket carried by a pole or like structure, Figure 4 is a fragmentary view showing a detail of construction, Figure 5 is a front view of the operating mechanism which controls the opening and reclosing operations of the circuit breaker contacts, Figure 6 is a back view similar to Figure 5 showing the operating spring and its winding motor, together with other details, Figure 7 is a side view of the apparatus as illustrated in Figures 5 and 6 looking from the right of Figure 5, and Figures 8 and 9 are detailed views with parts omitted to more clearly illustrate in connection with Figure 5 the operating movements of the circuit breaker opening and reclosing mechanism.

Reference is now made to the drawings for a detailed description of the invention. For the purpose of this description I have illustrated my invention as embodied in a circuit breaker of the single pole type. But, it is to be understood that the invention may be embodied in a circuit breaker of the multiple pole type, as will be readily apparent to those skilled in the art.

As shown in Figures 1, 2 and 3 of the drawings, the entire circuit breaker mechanism is adapted to be mounted as a unit upon an elevated support, such as the crossarm of a pole or upon a bracket that may be carried by a suitable supporting structure. A novel feature of the invention is considered to reside in the fact that the entire mechanism is completely self-contained and is, therefore, adapted to be mounted in a zone of high potential and in a safe operating position. As shown in Figure 1, the entire circuit breaker is carried by a cover-like supporting member 10 which supports two insulators 11 and 12 that are preferably of the bushing type. The insulator 11 has a line terminal 13 at its outer end and at its lower end it projects downwardly through the cover-like supporting member 10 and supports a suitable stationary contact 14 that is enclosed in an arc extinguishing chamber 15. Likewise, the insulator 12 carries a line terminal 16 at its upper end and projects downwardly through the cover-like supporting member 10 where it carries a suitable supporting frame 17 upon which a contact 18 is movably mounted so as to cooperate with the stationary contact carried by the insulator 11. In addition to the movable contact 18, the supporting frame 17 also serves as a support for a complete operating mechanism for moving the contact member 18 into and out of engagement with the cooperating stationary contact 14 at the lower end of the bushing 11. The insulators 11 and 12 are shown as secured intermediate their ends to the cover-like supporting member 10 by means of suitable clamps 19 and they each include centrally disposed conductors that respectively provide for a connection between the line terminals 13 and 15 and the contacts 14 and 18 at the lower ends thereof. In this figure of the drawings the insulators 11 and 12 are also shown as having arcing horns 20 disposed adjacent their outwardly extending portions. As here shown, the cover-like supporting member 10 also carries an enclosure forming tank 21 that is adapted to carry an insulating oil or other arc extinguishing fluid 22 into which the stationary contact 14 with its arc extinguishing chamber 15 and the supporting frame with the movable contact 18 and its operating mechanism, here designated by the numeral 23, are adapted to be completely submerged. The tank 21 projects upwardly into the cover-like supporting member 10 and is provided with a gauge 24 through which the oil therein may be observed. At this point it will be noted that the cover-like supporting member 10 also provides a support for a manually operable lever means 25 by means of which the operating mechanism 23 may be manually controlled. This manually operable lever means 25 is connected to the operating mechanism 23 through an insulating rod 26 which, when reciprocated by an oscillation of the lever means 25, operates to effect a winding of an energy storing spring, and at the limits of its reciprocating movement, the insulating rod 26 is also adapted to cooperate with the operating mechanism 23 to accomplish other functions which are to be described in detail hereinafter.

As shown in Figure 2 of the drawings, the cover-like supporting member 10 is provided with an inverted channel plate 27 with which tie-rods 28 and a clamping plate 29 cooperate as a means to secure the circuit breaker upon a crossarm 30 of a supporting pole. In Figure 3 this inverted channel plate 27 is shown as secured to an outwardly extending bracket 31 that is carried by a pole 32. Another detail of construction which should be noted at this time is the manner in which the supporting frame 17 is secured upon its supporting insulator 12 in insulated relation with the line terminal 16 at the outer end thereof. This detail of construction is illustrated in Figure 4 of the drawings. As here shown, the line terminal 16 carries a conductor 33 that is threaded into a terminal member 34 that is secured into the lower end of the insulator 12 by a suitable cement 35, and attached to this terminal member 34 by means of a screw 36 there is a metallic conducting plate 37 of triangular outline. This conducting plate 37 has three outwardly disposed enlarged apertures containing insulating pad forming bushings 38 against which the supporting frame 17 is secured in insulated relation by suitable screws 39.

Upon referring to Figure 5 of the drawings, it will be seen that the movable contact member 18 is pivotally mounted at its end to the upper part of the supporting frame 17, and intermediate its ends, this contact member 18 carries a link 40 that connects with a crank arm 41 which is mounted upon a shaft 42 that is adapted to be moved through a series of complete revolutions by an energy storing clock spring 43, as will hereinafter appear. At the end of the crank arm 41 there is an abutment-engaging roller 44 which engages a movable abutment 45 when the movable contact 18 is in its circuit closed position, as here illustrated. The movable abutment 45 is shown as pivoted upon a stud 46 intermediate its ends, and at its upper end, it connects with a toggle mechanism that is formed by two connected links 47 and 48, the latter of which is secured to the supporting frame 17 by a stud 49. Associated with the link 48 there is also an eccentrically mounted stop pin 50 that is adjustable to hold the toggle links 47 and 48 in a slightly overcenter position when the toggle mechanism is extended. A spring 51 connected to the link 47 operates to extend this toggle mechanism and thus return the movable abutment 45 to its operative position to engage the roller 44 upon the crank arm 41 after each operation thereof. At the upper part of the supporting frame 17 there is a magnetic field structure 52 which is excited by a winding 53 which is shown as composed of two coils that may be connected either in series or in parallel with each other. One end of this winding 53, designated by the numeral 54, is adapted to be connected through the conducting plate 37 to the terminal 16 at the outer end of the bushing 12, as is more clearly illustrated in Figure 4 of the drawings, and the other end of this winding 53 is arranged to be connected to the end of the movable contact member 18 by means of a flexible current conducting jumper 55. Associated with the field structure 52 there is a pivotally mounted armature 56 that is adapted to be attracted and moved upwardly when the current flowing through the winding 53 reaches a predetermined value; as for example, an overload current condition. Attached to the pivotally mounted armature 56 there is a slotted link 57 which engages a pin 58 intermediate the ends of the link 48 of the toggle mechanism, and at its outer end the pivotally mounted armature 56 is connected through a tension spring 59 to an adjustable securing means 60 by means of which the tension upon the spring 59 may be varied to determine the value of current at which the pivotally mounted armature 56 will operate. When this pivotally mounted armature 56 is attracted by the magnetic field structure 52, as is understood in the art, the slotted link 57 will be carried upwardly a distance sufficient to trip the toggle mechanism formed by the links 47 and 48. This collapse of the toggle mechanism will rotate the movable abutment 45 in a clockwise direction about the stud 46 and, as a result, the roller 44 at the outer end of the crank arm 41 will become disengaged and thus permit the energy storing clock spring 43 to rotate the crank arm 41 through an arc of its path of movement sufficient to effect a disengagement of the movable contact member 18 from the cooperating stationary contact 14 and thus open the circuit. In order to provide for a delay in the action of the pivotally mounted armature 56 upon the event of an overload condition in the circuit controlled by the circuit breaker, the pivotally mounted armature 56 also carries a link 61 that is connected to a gear 62 which is freely mounted upon a shaft 63 so as to cooperate with a timing mechanism that also serves the additional function of timing the reclosing operations of the circuit breaker, as will be presently described. When the movable contact member 18 has been moved into its open circuit position, as above indicated, the abutment engaging roller 44 at the end of the crank arm 41 will be brought into engagement with a second abutment 64 which is rotatably mounted upon the shaft 63. This second abutment 64 is connected to a gear 65 which, like the gear 62, is associated with the timing mechanism and is normally held against a stop 64' by a spring 65'. As shown, the abutment 64 is provided with a substantially flat roller engaging portion that is adapted to provide an impact surface for the abutment engaging roller 44, and leading from this impact surface it has a receding cam-like surface that will permit a passing of the abutment engaging roller 44 thereby when it is rotated counter-clockwise from the position illustrated in this figure of the drawings. In order to provide for this counter-clockwise movement of the second abutment 64, the crank arm 41 is provided with a spring engaging projection 66 that is adapted to engage the outer end of a leaf spring 67 which is carried by the second abutment 64 in such a manner that it will be placed under stress when the abutment engaging roller 44 is brought into contact with the second abutment 64. Because of the stress thus placed upon the leaf spring 67, the second abutment 64 and its attached gear 65 will tend to rotate in a counter-clockwise direction and as this rotation continues, the abutment engaging roller 44 upon the crank arm 41 will, because of the cam-like surface of the second abutment 64, cause this latter abutment to rotate more positively under the action of the energy storing spring 43. But, due to the timing mechanism with which the gear 65 connects, the release of the crank arm 41 will be delayed for a period which will be determined by the adjustment of the timing mechanism. As soon as the second abutment 64 has rotated counter-clockwise a sufficient distance to release the crank arm 41, the clock spring 43 will again operate through the link 40 and the crank arm 41 to swing the movable contact member 18 into circuit making engagement with the stationary contact 14 and thus reclose the circuit through the circuit breaker.

The timing mechanism above referred to is to be the subject matter of a separate application. Therefore, for the purpose of this application it is only briefly described as follows. It will be understood that the gears 62 and 65, which respectively control the movement of the pivotally mounted armature 56 and the rotation of the second abutment 64, are each mounted to rotate about the axis of the shaft 63. These gears 62 and 65 are so spaced with respect to each other axially that at their peripheries they will engage corresponding pinions 68 that are mounted upon a shaft 69. Each of these pinions 68 rotate freely about the shaft 69 and are attached to similar ratchet wheels 70, one of which is disposed on each side of a central gear 71. This central gear carries ratchet wheel engaging pawls 72 which cooperate with the ratchet wheels 70 and provide a driving connection between the central gear 71 and the gears 62 and 65 when they are rotated in a counter-clockwise direction. When the central gear 71 is thus driven, it will move in a clockwise direction and operate through a pinion 73 to rotate a notched escapement wheel 74 with which a controlling anchor 75 cooperates. To control the oscillations of the anchor 75, there is an inertia weight 76 which rotates about a shaft 77 and is attached to the controlling anchor 75 at a point 78. With the above described arrangement, it will be seen that, because of the ratchet and pawl connection between the central gear 71 and the two outer gears 62 and 65, these latter gears will be free to return to their initial positions immediately upon a release of the pivotally mounted armature 56 or the second abutment 64 and, as a result, the timer engaging gears 62 and 65 will always be in a position to operate in conjunction with the timing mechanism at the instant their particular operation is required.

While it is contemplated that under normal operation conditions the energy storing spring 43 will be maintained in a wound condition by an electric motor means, as will be hereinafter described, means is also provided for manually winding the energy storing spring 43. The energy storing spring 43 is encased in a housing, one side of which is in the form of a relatively large gear 79 that has teeth of a relatively small pitch with which a dog 80 carried by the insulating rod 26 is adapted to cooperate. As here shown, the lower end of the insulating rod 26 and the gear tooth engaging dog 80 are positioned in cooperating relation with the gear 79 by means of a pivoted link 81 which moves about the axis of the shaft 42 to which the inner end of the energy storing spring 43 is connected. With this arrangement it will be seen that when the manually operable lever means, shown in Figure 1 of the drawings, is moved up and down by a lineman through the medium of an operating pole, a step by step winding movement will be imparted to the gear 79 upon each upward movement of the insulating rod 26 and in this manner the energy storing spring 43 may be completely wound. In addition to providing a means for winding the energy storing spring 43, the insulating rod 26 also carries two spaced pins 82 and 83 which are adapted to engage a lever means 84 that extends outwardly from the supporting frame 17. The lever means 84 is shown as positioned along the rear side of the supporting frame 17 and it is connected through a supporting shaft 85 to an oppositely extending lever arm 86 that is adapted to engage a pin 87 which projects outwardly from the link 47 of the toggle mechanism. In this arrangement when the pin 82 carried by the insulating rod 26 is forced downwardly into engagement with the lever means 84, the oppositely projecting lever arm 86 will move upwardly and engage the projecting pin 87 and thus trip the toggle mechanism formed by the links 47 and 48. This will cause the movable abutment 45 to move out of retaining engagement with the roller 44 carried by the crank arm 41 and permit the energy storing spring 43 to operate the crank arm 41 through a circuit breaker opening movement. At the same time, in order to prevent an operation of the timing mechanism and thus permit a subsequent automatic, but timed, reclosing of the circuit breaker, the lever means 84 is also adapted to move a spring finger 88 carried by the lever arm 86 into braking relation with the timer controlling anchor 75. At this point it should be stated that when the lever means 25 is moved upwardly into its extreme position, it will be latched or remain in this position until a positive downwardly operating force is exerted thereupon through the operating pole in the hands of the lineman. In addition to the above manual control of the reclosing mechanism, the lever means 84 is also adapted to cooperate with the operating lever 25 to determine the current value at which the pivotally mounted armature 56 will operate to trip the toggle mechanism formed by the links 47 and 48. This latter function is accomplished by an engagement of the pin 83 with the lever means 84 and by the position of an adjustable stop means 89 which limits the downward movement of the manual lever means 25, as illustrated in Figure 1 of the drawings. This stop means 89 cooperates with an extending arm 90 that is carried by the lever means 25. When the stop means 89 is adjusted to provide for a pick-up of the pivotally mounted armature 56 at a value less than its maximum pick-up value, the pin 83 will engage the lever means 84 and operate through a flange 91 carried by the lever arm 86 to control the position of an armature engaging lever 92 that is biased into its upper operative position by means of a spring 93. This lever 92 is pivotally mounted upon a pin 94 and at its end it has a flanged extension 95 upon which the pivotally mounted armature 56 is adapted to rest. The lever means 92 is here illustrated as in the position which it will assume when the pin 83 carried by the insulating rod 26 is moved upwardly into the position shown by dot and dash lines in Figure 5 of the drawings. Now, when the stop means 89 is adjusted to stop the manual lever means 25 in a position where the pin 83 upon the insulating rod 26 is in a lower position than that shown by dot and dash lines, it will be seen that the lever 92 will be held by the flange 91 with its end 95 in a somewhat higher position and, as a result, the pivotally mounted armature 56 will be supported in a position closer to the electromagnetic field 52 where the amount of current required to operate same will be less than that required to operate the armature 56 when it is in the position here shown. This means of adjustment for the position of the pivotally mounted armature 56 with respect to the magnetic field structure 52 is especially valuable in connection with the present circuit breaker, as it provides a means by which the overload characteristic of the circuit breaker may be changed at a point externally of the enclosing housing formed by the cover-like supporting member 10 and the oil containing tank 21.

Reference is now made to Figure 6 of the drawings for a brief description of an electromagnetic motor means which has been found particularly well suited to the purpose of maintaining the energy storing spring 43 in a wound condition. This electromagnetic motor means is of special construction and it, together with other novel features, is to be made the subject matter of a companion application for patent. In the present embodiment and for the purpose of this application, the electromagnetic motor means is illustrated as comprising a vibratory armature 96 that is positioned and supported adjacent the magnetic field structure 52 by means of a flexible supporting member 97 which is secured at its fixed end to a boss 98 carried by the supporting frame 17. At its free end the flexible supporting member 97 is turned down to provide a depending end 99 that carries a clutching device 100 which forms a uni-directional driving connection between the vibratory armature 96 and a rotatably driven disc 101 which is suitably journaled upon the supporting frame 17. Associated with the vibratory armature 96, the flexible supporting member 97 also carries an outwardly extending bracket 102 which cooperates with a compression spring 103 that exerts a bias upon the vibratory armature 96 and thus insures a positive vibration of the vibratory armature 96 when the magnetic field winding 53 is excited by an alternating electric current. The outwardly extending bracket 102 is shown as operable between an adjustable stop nut 104, and the compression spring 103 is shown as held in position by means of an enlarged head 105 carried by a threaded stud 106 which is also carried by the supporting frame 17. With this arrangement it will be seen that when the magnetic field structure 52 is excited with an alternating current, the vibratory armature 96 will be attracted and released during each alternation of the magnetic field exciting current so as to periodically compress and release the compression spring 103 and, as a result, the clutching device 100 will vibrate in a vertical path substantially tangent to the periphery of the disc 101. Because of space considerations, the clutching device 100 is so designed and arranged that it will grip and exert a downward driving force upon the disc 101 under the influence of the compression spring 103 upon each electromagnetic release of the vibratory armature 96. In other words, when the vibratory armature 96 is attracted by the magnetic field structure 52, it will compress the compression spring 103, and when released, the compression spring 103 will transmit its stored energy to the clutching device 100 and thus cause the disc 101 to rotate in a counter-clockwise direction, as viewed in this figure of the drawings. Connected to and mounted adjacent the far side of the disc 101, there is a small pinion that meshes with a relatively larger gear 107 which in turn drives a second pinion 108 that engages the teeth of the gear 79 which forms a part of the housing for the circuit breaker energy storing spring 43, as above described. While the clutching device 100 may take many different forms, it is here shown as of the type illustrated in my copending application Serial No. 301,781, filed October 28, 1939 and entitled Electromagnetic motor. In this arrangement the clutching device 100 employs rollers or balls that are disposed at opposite sides of the disc 101 and cooperate with oppositely disposed and inclined retaining surfaces which produce a wedge-like gripping action upon the disc 101 as the clutching device 100 moves in one direction and release when the clutching device 100 moves in an opposite direction. In this particular device the power stroke exerting characteristic of the compression spring 103 and the gear reduction between the rotatably driven disc 101 and the energy storing spring 43 is so proportioned that under normal operating conditions a winding torque will be exerted upon the latter spring which will be great enough to overcome any back torque that might be exerted by the energy storing spring 43. As a result, the energy storing spring 43 will be maintained in a wound condition sufficient to produce at least three complete reclosing and a final opening operation of the circuit breaker. In order to prevent any unwinding operation of the energy storing spring 43 after the final circuit breaker opening operation, there is provided a stop engaging means 109 that moves radially in a channel-like guide 110 which is carried by the shaft 42 and moves relative to a plate 111 that cooperates with the gear 79 to form a housing for the energy storing spring 43. This plate 111 is provided with a spiral groove 112 with which a pin 113 carried by the stop engaging means 109 cooperates to control its radial movement. Disposed in the path of the stop engaging means 109 and carried by a cover plate (not illustrated in this figure of the drawings) there is a stop pin 114 against which the stop engaging means 109 will come to rest when the movably mounted contact member 18 of the circuit breaker is in its final open circuit position. In addition to the last above function, the stop engaging means 109 is also arranged and adapted so that its opposite end 115 will engage a lever 116 when the energy storing spring 43 approaches its fully wound condition. As previously stated, this aspect of the present disclosure is to be described in more detail and claimed in a companion application and, therefore, it is believed sufficient at this point to merely state that when the lever means 116 is engaged by the end 115 of the radially movable stop engaging means 109, the lever means 116 will operate through an integrally formed lever arm 117, a compression spring 118 and a second lever 119 which engages the vibratory armature 96 to hold the vibratory armature 96 in contact with the magnetic field structure 52 and thus prevent any objectionable chattering of the vibratory armature 96 when the energy storing spring 43 is fully wound.

Upon referring to Figure 7 of the drawings, it will be seen that the supporting frame 17, upon which the circuit breaker operating mechanism 23, the energy storing spring 43 and the electromagnetic spring winding motor are mounted, is provided with a centrally arranged and depending plate-like portion from which there extends in opposite directions a plurality of integral bosses to which there are secured outer plates 120 and 121. The outer plate 120, in addition to protecting the circuit breaker operating mechanism 23, also serves as a support for the several shafts upon which the various rotary elements are mounted, and the plate 121 provides a protective covering and support for the several shafts upon which the gears and pinions associated with the energy storing spring 43 and its winding motor are mounted, as described above. Another feature of the present invention, which is more clearly illustrated in this figure of the drawings, resides in the fact that the magnetic field structure 52 is formed of two parts so that the magnetic flux produced by the single winding 53 will be concentrated in such a manner as to be effective upon both the electromagnetic toggle tripping armature 56 and the electromagnetic motor armature 96. In this view of the drawings, it will also be noted that there is shown a second, but narrower, toggle tripping armature, designated by the numeral 122, which is mounted closely adjacent the electromagnetic armature 56. The purpose of this second toggle tripping armature 122 is to provide for a tripping of the toggle mechanism formed by the links 47 and 48 without the time delay which is interposed in the action of the toggle tripping armature 56 by the timing mechanism, as above described. This armature 122 is shown as connected to the toggle link 48 by a slotted link 123 which operates in a manner similar to that of the slotted link 57. The provision of this auxiliary armature 122 in this assembly is considered novel and since it is the invention of another, this aspect of the present disclosure is to be made the subject matter of a separate application for patent. As is more clearly shown in this figure of the drawings, the adjustable securing means 60, to which the lower end of the tension spring 59 is connected, is in the form of a slotted plate that is adapted to slide below a clamping member 124 which is secured upon the supporting frame 17 by means of a screw 125. The clamping member 124 has a pointer 126 which, as here illustrated, cooperates with certain graduations upon the member 60 to indicate the tension exerted upon the armature 56 by the spring 59. In this same manner the armature 122 is biased downwardly beneath a spring 127 that is secured to a similar adjustable plate 128 that is secured by a clamping member 129 by a screw 130. To further illustrate the manner in which the timer engaging gears 62 and 65 are mounted upon the shaft 63, portions of these two gears have been broken away in this figure of the drawings to show in section their present construction. As here shown, it will be noted that the inner gear 62 is provided with a hub 131 which is freely journaled upon a relatively long sleeve or extending hub 132 which connects the outer timer engaging gear 65 with the so-called second abutment 64, the abutment 64 being splined upon the inner end of this sleeve or hub 132.

Reference is now again made to Figure 5 and to Figures 8 and 9 of the drawings for a more detailed description of the operation of a circuit breaker constructed in accordance with the present embodiment of my invention. In the latter figures of the drawings the timer mechanism and certain other elements have been omitted to more clearly disclose the energy storing spring controlling means which serves to limit the operative movement of the movable contact member 18 during a series of circuit opening and reclosing operations. It will first be assumed that the movable contact member 18 of the circuit breaker is in its circuit closed position and that the pivotally mounted armature 56 is in the position shown with the movable abutment 45 operating to retain the crank arm 41 and the movable contact member 18 in their closed circuit position against the action of the energy storing spring 43 which, it will also be assumed, is in a fully wound condition. Now, should an overload condition occur, the excessive current passing through the winding 53 will further energize the magnetic field structure 52 and thus attract the pivotally mounted armature 56. The armature 56 will then be moved upwardly against the action of the spring 59 until the slotted link 57 carried thereby has tripped the toggle mechanism formed by the links 47 and 48. During this upward movement of the pivotally mounted armature 56, it will be understood that its movement will be delayed by the timing mechanism previously described through the connecting link 61 which is secured to the timer engaging gear 62. As soon as the pivotally mounted armature 56 has moved in this manner sufficiently to trip the toggle mechanism formed by the links 47 and 48, the movable abutment 45 will be carried out of interfering relation with the roller 44 at the end of the crank arm 41 and, as a result, the energy storing spring 43 will be free to operate through the shaft 42 and move the roller 44 at the end of the crank arm 41 into abutting engagement with the second abutment 64, as shown in Figure 8 of the drawings. During this movement of the crank arm 41, it will be seen that the spring engaging projection 66 upon the crank arm 41 will engage the leaf spring 67 and thus produce a preliminary bias upon the second abutment 64 which will tend to rotate this abutment in a counter-clockwise direction. At this point, however, the counter-clockwise rotation of the second abutment 64 will also be controlled by the timer mechanism and, as a result, the circuit breaker reclosing movement of the crank arm 41 under the influence of the energy storing spring 43 will be delayed until the second abutment 64 has rotated around and into the position where it is illustrated in Figure 9 of the drawings. At this point it will be seen that the roller 44 at the end of the crank arm 41 will be free to pass by the abutment 64 and continue around until the movable contact member 18 has been brought into full engagement with its cooperating stationary contact 14. At the same time, the roller 44 upon the crank arm 41 will again come to rest against the movable abutment 45. Should it happen that the overload or fault is cleared from the circuit during this initial opening and reclosing operation of the circuit breaker, the parts will remain in the positions illustrated in Figure 5 of the drawings. However, if the fault continues through this initial opening and reclosing operation, the pivotally mounted armature 56 will be again attracted by the magnetic field structure 52 and the above operations will be again repeated through a second and a third reclosing of the circuit breaker, or until the energy storing spring 43 has become nearly exhausted of its stored energy. At this point, due to the spiral groove 112 upon the plate 111 and the pin 113, all of which are associated with the energy storing spring 43 to control the radial movement of the stop engaging means 109, this latter stop 109 will come into engagement with the stationary stop 114 after three complete reclosing and a final opening operation of the circuit breaker. This will leave the apparatus in a position where it will no longer operate automatically and, as a result, it will then be necessary for a lineman to manually rewind the energy storing spring 43. This can be done by means of an operating pole and the external lever means 25 previously described in connection with Figure 1 of the drawings. Should it happen that the overload or fault is removed from the circuit breaker prior to any one of the above described reclosing operations, the circuit breaker will remain in its circuit closed condition. The line current will then flow through the winding 53 upon the magnetic field structure 52 and, as a result, the vibratory armature 96 will operate through the rotatably driven disc 101 to rewind the energy storing spring 43, as above described.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In an overload responsive reclosing circuit breaker, the combination of a supporting member, a pair of insulators mounted in spaced relation upon said supporting member, a stationary contact secured to an end of one of said insulators and connected to a terminal at the other end thereof, a contact supporting frame secured to and carried by the corresponding end of the other of said insulators, a movable circuit controlling contact mounted upon said frame adapted to move into and out of engagement with the stationary contact carried by the first of said insulators to complete or interrupt a circuit therebetween, spring means carried by said supporting frame for moving said circuit controlling contact through a predetermined cycle of operations, a trippable release mechanism for rendering said spring means operative to move said circuit controlling contact out of engagement with said stationary contact, a current carrying coil connected in series circuit between said circuit controlling contact and a terminal at the other end of said latter insulator adapted upon the occurrence of an overload to control said trippable release mechanism and permit said spring means to operate said movable circuit controlling contact through a circuit interrupting and a circuit reclosing operation of its predetermined cycle of operations in the event of an abnormal current condition, and means operative upon the completion of a circuit opening operation of said movable circuit controlling contact for delaying for a predetermined time interval the circuit reclosing movement of said movable circuit controlling contact to reestablish the circuit controlled by the circuit breaker.

2. In an overload responsive reclosing circuit breaker, the combination of a supporting member forming the cover of an enclosure, a pair of bushing-type insulators mounted in spaced relation and extending downwardly through said supporting member and into said inclosure, a stationary contact secured to the lower end of one of said insulators and connected to a terminal at the outer end thereof, a contact supporting frame secured to and carried by the other of said insulators, a movable circuit controlling contact supported by said frame and adapted to move into and out of engagement with the stationary contact carried by the first of said insulators to respectively complete or interrupt a circuit therebetween, spring means carried by said supporting frame for operating said movable circuit controlling contact through a circuit opening and circuit reclosing operation with respect to said stationary contact, a holding mechanism for rendering said spring means inoperative to move said circuit controlling contact out of engagement with said stationary contact, a line current carrying coil responsive to an overload current connected in series circuit between said circuit controlling contact and a terminal at the outer end of said latter insulator adapted to release said holding mechanism, whereby said spring means will operate to move said movable circuit controlling contact out of engagement with said stationary contact in the event of abnormal current conditions, and means operative upon the completion of a circuit opening operation of said movable circuit controlling contact for delaying for a predetermined period of time the circuit reclosing movement of said movable circuit controlling contact by said spring means to reestablish the circuit controlled by the circuit breaker.

3. In an automatic reclosing circuit breaker of the character described, the combination of an insulator supporting member, a pair of bushing-type insulators mounted in spaced relation and extending downwardly through said supporting member, a stationary contact secured to the lower end of one of said insulators and having a line terminal at the outer end thereof, a supporting frame secured to and carried by the lower end of the other of said insulators, a circuit controlling contact pivotally mounted upon said frame and adapted to move into and out of engagement with the stationary contact carried by the first of said insulators, spring operated means carried by said supporting frame for moving said circuit controlling contact through a series of circuit opening and circuit reclosing operations, a mechanism for controlling the operation of said spring operated means, electromagnetic current responsive means also carried by said supporting frame and having a connection with a line terminal at the outer end of said latter insulator adapted to control said mechanism and initiate a circuit opening and reclosing operation of said circuit controlling contact by said spring operated means in the event of an abnormal current condition upon the circuit through the circuit breaker, and timing means operative upon the completion of a circuit opening operation of said movable circuit controlling contact by said spring means for delaying the circuit reclosing operation said movable circuit controlling contact to reestablish said circuit.

4. In a circuit breaker of the character described, the combination of a cover forming member, a pair of high potential insulator bushings mounted in spaced relation and extending downwardly through said cover forming member, an insulating fluid containing receptacle with which said cover forming member cooperates to provide an enclosure for the downwardly extending ends of said insulator bushings, a stationary contact mounted upon the lower end of one of said insulator bushings below the surface of the insulating fluid in said receptacle and connected to a line terminal at the outer end of said bushing, a movable circuit completing contact mounted upon the lower end of the other of said insulator bushings adapted when operated to engage and disengage said stationary contact, and an operating mechanism for controlling the operations of said movable contact also mounted upon and supported in its entirety by the lower end of said latter insulator bushing and insulated from grounding by said bushing and the insulating fluid in said receptacle, said operating mechanism comprising an energy storing spring means for operating said movable circuit completing contact through a predetermined cycle of operation, a latching mechanism for controlling the operation of said energy storing spring means, a continuously operative electric motor means for maintaining said energy storing spring means in a wound condition, electromagnetic means responsive to abnormal current conditions upon the circuit through the circuit breaker for controlling the operation of said latching mechanism, and a circuit connection from said movable circuit completing contact through said electromagnetic means and said electric motor means to a line terminal at the outer end of said latter insulator bushing, whereby the operation of the circuit breaker will be determined by the current passing therethrough.

5. In an automatic reclosing circuit breaker of the character described, the combination of a supporting frame adapted to be mounted in an insulated position, a movable contact member adapted to engage a cooperating stationary contact and establish a circuit therethrough, energy storing spring means adapted to move said movable contact member into and out of engagement with said cooperating stationary contact, a holding means adapted to retain said movable contact member in its closed circuit position, an electromagnetically responsive armature for releasing said holding means, an electric motor means carried by said supporting frame for maintaining said energy storing spring means in a wound condition, and a single magnetic field producing means energized by current flowing through the circuit breaker adapted under normal current conditions to provide an electromagnetic field for said electric motor means and under abnormal current conditions to attract said electromagnetically responsive armature and release said holding means, whereby said movable contact member will be moved into its open circuit position by said energy storing spring means in the event of abnormal current conditions upon the circuit through the circuit breaker.

6. In an automatic reclosing circuit breaker of the character described, the combination of a supporting frame adapted to be mounted in an insulated position, a movable contact member adapted to engage a cooperating stationary contact and establish a circuit therethrough, energy storing spring means adapted to move said movable contact member into and out of engagement with said cooperating stationary contact, a toggle controlled abutment adapted to hold said movable contact member in its closed circuit position, an electromagnetically responsive armature for releasing said toggle controlled abutment, an electric motor means for maintaining said energy storing spring means in a wound condition, and a magnetic field producing coil energized by current flowing through the circuit breaker adapted under normal operating conditions to provide an electromagnetic field for said electric motor means and under abnormal operating conditions to also attract said electromagnetically responsive armature and release said toggle controlled abutment and permit a circuit opening operation of said movable contact member by said energy storing spring means.

7. In an automatic reclosing circuit breaker of the character described, the combination of a supporting frame adapted to be mounted in an insulated position, a movable current carrying contact member pivotally mounted upon said supporting frame and adapted to engage a cooperating stationary contact, an energy storing spring means for operating said movable current carrying contact member through an operating cycle, means for normally preventing an operation of said energy storing spring means when said pivotally mounted contact member is in its circuit closed position, an electromagnetically responsive armature for rendering said last means inoperative, an electric motor for maintaining said energy storing spring means in a wound condition, and a single magnetic field structure having a winding energized by current flowing through the circuit breaker adapted under normal current conditions to provide an electromagnetic field for said electric motor and under abnormal current conditions to attract said electromagnetically responsive armature, whereby in the latter event said last means will be rendered inoperative and permit said energy storing spring means to move said pivotally mounted contact member out of circuit establishing relation with said cooperating stationary contact.

8. In an automatic reclosing circuit breaker of the character described, the combination of a supporting frame adapted to be mounted in an insulated position, a movable current carrying contact member pivotally mounted upon said supporting frame and adapted to engage a cooperating stationary contact, a rotatable crank operatively connected to said pivotally mounted contact member for moving said contact member into and out of engagement with said cooperating stationary contact, an energy storing spring means for rotating said crank through an operating cycle, a movable abutment adapted to normally hold said crank against the action of said energy storing spring means when said pivotally mounted contact member is in its circuit closed position, an electromagnetically responsive armature for moving said movable abutment into an inoperative position, an electric motor for maintaining said energy storing spring means in a wound condition, and a single magnetic field structure energized by current flowing through the circuit breaker adapted under normal current conditions to provide an electromagnetic field for said electric motor and under abnormal current conditions to attract said electromagnetically responsive armature, whereby in the latter event said movable abutment will be rendered inoperative and said crank will be rotated by said energy storing spring means and move said pivotally mounted contact member out of circuit establishing relation with said cooperating stationary contact.

9. In an automatic reclosing circuit breaker of the character described, the combination of a supporting frame, a movable current carrying contact member mounted upon said supporting frame and adapted to engage a cooperating stationary contact, spring means for biasing said movable current carrying contact member out of engagement with said cooperating stationary contact, a mechanism for normally holding said movable current carrying contact member into engagement with said cooperating stationary contact, a pivotally mounted armature upon one side of said supporting frame for rendering said mechanism inoperative in the event of abnormal current conditions in the circuit controlled by the circuit breaker, an electromagnetic motor of the vibrating armature type for maintaining said spring means in a wound operative condition mounted upon the other side of said supporting frame and having its vibrating armature disposed adjacent and opposite said pivotally mounted armature, and a single magnetic field structure carried by said supporting frame adapted to provide a common electromagnetic field for said pivotally mounted armature and the vibrating armature of said motor.

10. In an automatic reclosing circuit breaker of the character described, the combination of a movable contact adapted to engage a cooperating stationary contact, an energy storing spring means for operating said movable contact between its limits of movement, a latching mechanism for controlling the operation of said energy storing spring means, and a current responsive means having a magnetic coil and a pivotally mounted armature associated therewith for controlling said latching mechanism, lever means for determining the position of said pivotally mounted armature with respect to said magnetic coil to determine its pick-up characteristic, a second lever means adapted when operated in one direction to vary the position of said first lever means and when operated in another direction to control said latching mechanism independently of said pivotally mounted armature, a manually operable means having an operating member movable in a reciprocating path adjacent said second lever means and having engaging members positioned thereupon to engage said second lever means, whereby said manually operable means may be operated to control said latching mechanism at one end of its limit of movement and to determine the position of said pivotally mounted armature with respect to its magnetic coil at the other end of its limit of movement.

11. In an automatic reclosing circuit breaker of the character described, the combination of a movable contact adapted to engage a cooperating stationary contact, an energy storing spring means for operating said movable contact between its limits of movement, a latching mechanism for controlling the operation of said energy storing spring means, and a current responsive means having a magnetic coil and a pivotally mounted armature associated therewith for controlling said latching mechanism, lever means for determining the position of said pivotally mounted armature with respect to said magnetic coil to determine its pick-up characteristic, a second lever means adapted when operated in one direction to vary the position of said first lever means and when operated in another direction to control said latching mechanism independently of said pivotally mounted armature, a manually operable means for winding said energy storing spring means having an operating member movable in a reciprocating path adjacent said second lever means and having engaging members positioned thereupon to engage said second lever means, whereby said latching mechanism may be operated by said manually operable means at one end of its limit of movement to open the circuit breaker and the position of said pivotally mounted armature may be determined by said manually operable means when at the other end of its limit of movement.

12. In automatic reclosing circuit breaker of the character described, the combination of a movable contact adapted to engage a cooperating stationary contact, an energy storing spring means for operating said movable contact between its limits of movement, a latching mechanism for controlling the operation of said energy storing spring means, a current responsive means having a magnetic coil and a pivotally mounted armature associated therewith for controlling said latching mechanism, lever means for determining the position of said pivotally mounted armature with respect to said magnetic coil to determine its pick-up characteristic, and a manually operable means having an operating member movable in a reciprocating path adjacent said lever means and having an engaging member positioned thereupon to engage said lever means, whereby said manually operable means may be operated to determine the position of said pivotally mounted armature with respect to its magnetic coil at one end of its limit of movement.

13. In an automatic reclosing circuit breaker of the character described, the combination of a movable contact adapted to engage a cooperating stationary contact, an energy storing spring means for operating said movable contact between its limits of movement, a latching mechanism for controlling the operation of said energy storing spring means, a current responsive means having a magnetic coil and a pivotally mounted armature associated therewith for controlling said latching mechanism, a lever means adapted when operated in one direction to control said latching mechanism independently of said pivotally mounted armature, and a manually operable means for winding said energy storing spring means having an operating member movable in a reciprocating path adjacent said lever means and having an engaging member positioned thereupon to engage said lever means, whereby said latching mechanism may be operated by said manually operable means at one end of its limit of movement to open the circuit breaker independently of the pivotally mounted armature of said overload relay.

14. In a reclosing circuit breaker of the character described, the combination of a movable contact member adapted to engage a cooperating contact to close a circuit, crank means operable between two positions and connected to said movable contact to effect an opening and a circuit closing operation of said movable contact, an abutment engaging means at the end of said crank means for positioning same in a circuit closed position, a movable abutment adapted to be engaged by said abutment engaging means when said crank means is in said circuit closed position, means responsive to an abnormal condition upon the circuit controlled by the circuit breaker adapted to move said abutment out of engagement with said abutment engaging means, whereby said crank means may rotate through a predetermined arc to open the circuit breaker contacts, a second abutment adapted to be engaged by said abutment engaging means when said crank mans has moved through said arc of movement, a normally inactive biasing means for said second abutment adapted to be engaged by said crank means and when engaged thereby to bias said abutment into an inoperative position, and a timing means for controlling the movement of said latter abutment under the influence of said biasing means, whereby said crank means will be released to effect a reclosing operation of the circuit breaker after a predetermined time delay.

15. In an automatically operating reclosing circuit breaker, the combination of a movable contact member adapted to engage and disengage a cooperating contact to establish and interrupt a circuit therebetween, spring operated means for imparting a number of circuit interrupting and circuit establishing movements to said movable contact member with respect to said cooperating contact, a latching means associated with said operating mechanism adapted to hold said movable contact member in circuit establishing relation with said cooperating contact, electromagnetic means responsive to abnormal condition upon the circuit through said movable contact member and said cooperating contact for controlling said latching means, whereby in the event of a continuing overload condition upon the circuit through said contacts said spring operated means will move said movable contact as a continuous operation to successively interrupt and reestablish the circuit through said contacts, means cooperating with said movable contact member adapted to temporarily delay the operation thereof under the influence of said spring means when said movable contact member is in a circuit interrupting position with respect to said cooperating contact, and a timing means associated with said last means for controlling the time interval of said delay between the circuit interrupting and the circuit reestablishing movements of said movable contact member by said spring means.

JOSEPH S. THOMPSON.